(12) United States Patent
Flannagan et al.

(10) Patent No.: US 8,909,704 B2
(45) Date of Patent: Dec. 9, 2014

(54) NETWORK-ATTACHED DISPLAY DEVICE AS AN ATTENDEE IN AN ONLINE COLLABORATIVE COMPUTING SESSION

(75) Inventors: Michael E. Flannagan, Austin, TX (US); Chad R. Skipper, Round Rock, TX (US)

(73) Assignee: Cisco Technology, Inc., San Jose, CA (US)

( * ) Notice: Subject to any disclaimer, the term of this patent is extended or adjusted under 35 U.S.C. 154(b) by 853 days.

(21) Appl. No.: 12/770,324

(22) Filed: Apr. 29, 2010

(65) Prior Publication Data

US 2011/0271129 A1 Nov. 3, 2011

(51) Int. Cl.
*G06F 15/16* (2006.01)
*H04L 29/06* (2006.01)
*H04L 12/18* (2006.01)

(52) U.S. Cl.
CPC ......... *H04L 65/4015* (2013.01); *H04L 12/1827* (2013.01); *H04L 12/1822* (2013.01); *H04L 65/403* (2013.01)
USPC ........... 709/204; 709/203; 709/205; 709/228; 715/751; 715/753; 715/754

(58) Field of Classification Search
None
See application file for complete search history.

(56) References Cited

U.S. PATENT DOCUMENTS

| | | | |
|---|---|---|---|
| 7,266,772 B2 | 9/2007 | Miyashita et al. | |
| 7,500,880 B1 | 3/2009 | Vaziri et al. | |
| 7,640,301 B2 * | 12/2009 | Walter | 709/204 |
| 7,679,639 B2 | 3/2010 | Harrell et al. | |
| 7,692,680 B2 | 4/2010 | Graham et al. | |
| 7,693,734 B2 | 4/2010 | Christenson et al. | |
| 8,319,819 B2 * | 11/2012 | MacDonald et al. | 348/14.09 |
| 2003/0174826 A1 * | 9/2003 | Hesse | 379/210.01 |
| 2004/0117194 A9 | 6/2004 | Lee et al. | |
| 2005/0091359 A1 | 4/2005 | Soin et al. | |
| 2006/0053194 A1 * | 3/2006 | Schneider et al. | 709/204 |
| 2006/0168532 A1 * | 7/2006 | Stevens et al. | 715/753 |
| 2007/0115348 A1 * | 5/2007 | Eppel et al. | 348/14.08 |
| 2007/0208812 A1 | 9/2007 | Pearce et al. | |
| 2008/0316348 A1 | 12/2008 | Hallock | |
| 2009/0309846 A1 | 12/2009 | Trachtenberg et al. | |
| 2011/0197263 A1 * | 8/2011 | Stinson, III | 726/4 |

OTHER PUBLICATIONS

"Dell 5500/S500wi Projector"—Dell, Feb. 2010 http://www.projectorcentral.com/pdf/projector_manual_6202.pdf.*

International Search Report and Written Opinion in counterpart International Application No. PCT/US2011/000621, mailed Nov. 25, 2011.

(Continued)

*Primary Examiner* — Randy Scott (57) ABSTRACT

In one embodiment, a network-attached display device (e.g., projector) may join an online collaborative computing session as an attendee. The display device may then receive data for the online collaborative computing session as an attendee over the computer network. As such, the display device may render images associated with being an attendee of the online collaborative computing session from the received data, and then visually display the images associated with the online collaborative computing session.

24 Claims, 7 Drawing Sheets

(56) References Cited

OTHER PUBLICATIONS

Espon Launches PC-Free 802.11g Wifi Enabled Projector Models, retrieved from: http://www.prwire.com.au/pdf/epson-launches-pc-free-802-11q-wifi-enabled-projector-models, Epson, Sep. 2004, 2 pages.

Walk-and-Talk interactive Panel, retrieved from: http://www.poly-vision.com/LinkClick.aspx?fileticket=E8eYmt9o26s%3d&tabid=155&mid=1059, PolyVision Corporation, Document ID: TECHIP17EDU0508, 2008, 2 pages.

Cisco TelePresence System 3000, Cisco Systems, Inc., Data Sheet Document ID: C78-266302-08, Jan. 2010, 6 pages.

Instant Wireless Series, Wireless Presentation Player, Model No. WPG12, Linksys Group, Inc., Document ID: DS-WPG12-120902NC BW, 2002, 2 pages.

Pancescu, A., Hitachi Expands It's Projector Lines, retrieved from: http://news.softpedia.com/news/Hitachi-Expands-its-Projector-Lines-63942.shtml, Aug. 2007, 2 pages.

* cited by examiner

NETWORK-ATTACHED DISPLAY DEVICE AS AN ATTENDEE IN AN ONLINE COLLABORATIVE COMPUTING SESSION

TECHNICAL FIELD

The present disclosure relates generally to computer networks, and, more particularly, to network-attached display devices and online collaborative computing sessions.

BACKGROUND

When participating in a meeting, whether in a physical conference room or over the internet through an online collaborative computing session, it may be beneficial to use a display device such as a projector to show screen images to a plurality of attendees. Generally, this is accomplished through a physical connection between a participant's computer (personal computer or "PC", laptop, etc.) and the display device in order to relay the image on the computer to the display device. While this may pose problems for certain users, such as those needing an adapter to connect to standard projectors, it particularly causes problems when multiple presenters to an online collaborative computing session are located within a same conference room. In this instance, it is often necessary to connect the presenter's computer to both the projector and maintain presenter rights for the online collaborative computing session. Should presenters change during the meeting, this creates an unnecessarily time consuming exchange of the wires connected to the projector, in addition to the maintenance of presenter rights for the online collaborative computing session. Furthermore, generally setting up a projector in a conference room, particularly for online meetings, often requires cumbersome and inefficient manual configuration.

BRIEF DESCRIPTION OF THE DRAWINGS

The disclosure may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a network-attached display device (e.g., projector) may join an online collaborative computing session as an attendee, such as by signing into the session using information obtained in a variety of ways. The display device may then receive data for the online collaborative computing session as an attendee over the computer network. As such, the display device may render images associated with being an attendee of the online collaborative computing session from the received data, and then visually display the images associated with the online collaborative computing session. Also, according to one or more embodiments, various techniques may be used to efficiently schedule the display device for joining a particular online collaborative computing session.

Figure 1:
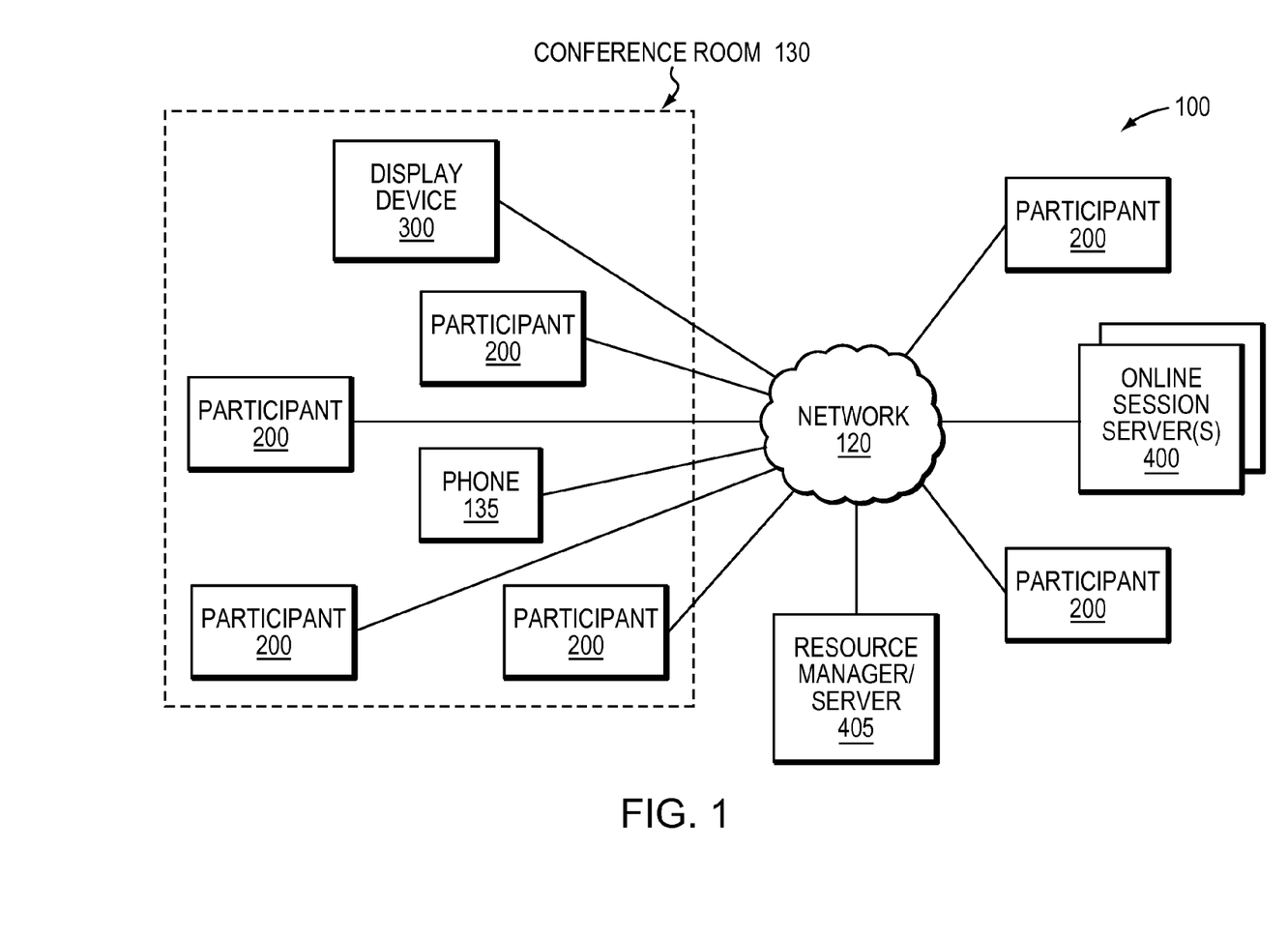
FIG. 1 illustrates an example computer network.

A) Network Architecture:

FIG. 1 is a schematic block diagram of an example computer network 100 illustratively comprising nodes/devices, such as one or more participant/client devices 200 and one or more interaction servers 400 interconnected by links/network 120 as shown and as described further herein. For instance, participant devices, as described below, may be a personal computer (PC) or laptop, or one or more peripheral devices, such as phones, etc. Also, as described herein, one or more network-attached display devices 300 may also be interconnected to the network 120, as well as a resource manager (server) 405, as described below. Note that for illustrative purposes, certain participant devices may be located within a conference room 130, e.g., with phone 135. Those skilled in the art will understand that any number of nodes, devices, links, etc. may be used in the computer network, and that the view shown herein is for simplicity.

In this environment, a number of participants may interact in an online, interactive, or collaborative setting. Such a setting can be for a meeting, training or education, support, or any other event that may require a number of participants to work together, interact, collaborate, or otherwise participate, such as web/video conferences, online meetings, etc. As used herein, the phrase "collaborative computing session" may be used to describe these settings/events, particularly where a number of participant computers/devices collaborate in an established session, as may be appreciated by those skilled in the art. Also, as used herein, a "session" describes a generally lasting communication between one or more participant devices 110 through the interaction server 130. Those skilled in the art will understand that the session may be implemented/established using protocols and services provided by various layers (e.g., application, session, and/or transport layers) of a network protocol stack according to the well-known OSI model. Conversely, a "meeting" describes a personal layer of communication overlaid upon the session where participants/users communicate with each other. Moreover, while the terms "session" and "meeting" may generally be used interchangeably herein to denote a collaboration of people or devices, particular instances of their use may denote a particular distinction (e.g., a session may start with attendees joining/connecting to the servers, while a meeting may not start until a host/presenter joins the session), as may be understood by those skilled in the art.

In particular, each participant (e.g., hosts/presenters and/or attendees) may operate a participant device. Each participant device (or client device, herein) 200 may comprise an electronic device with capability for visual and/or auditory presentation. Thus, a participant device can be, for example, a desktop personal computer (PC), a laptop computer, a workstation, a personal digital assistant (PDA), a wireless telephone, a smart phone, an Internet television, and the like. Each participant device 200 supports communication by a respective participant, in the form of suitable input device (e.g., keyboard, mouse, stylus, keypad, etc.) and output device (e.g., monitor, display, speech, voice, or other device supporting the presentation of audible/visual information). Each participant device may be interconnected with a suitable communications network 120 such as, for example, the Internet, and may appear as a client computer thereon.

In one embodiment, each participant device 200 may operate under the control of a suitable operating system (OS) (e.g., WINDOWS, UNIX, etc.) to run software applications (e.g., in the form of code modules) which may be installed, received, or downloaded. At least some of these software applications may support specific functions, such as, for example, functions related to the online, interactive meeting (a collaborative computing session), such as conventional web browser programs that allow convenient access and navigation of the Internet (e.g., the World Wide Web).

The online meeting (collaborative computing session) of the various participants may be supported by an interaction server 400 which may be maintained or operated by one or more of the participants and/or a third-party service provider. The interaction server 400 may be a computer system that is connected to network 120, and which may comprise and appear as one or more server computers thereon. Interaction server 400 may store information and/or content (e.g., audio, video, presentations, etc., such that the server is a source of the communication session), and application modules which can be provided to the participant devices 200. In some embodiments, the application modules are downloadable to the participant devices 200 and may support various functions that may be required for an interactive meeting or collaborative effort among the participants. The participant devices 200 and the interaction server 400 may interact in a client/server architecture, which may provide high performance and security for a multi-participant collaborative environment.

Network 120 may comprise or be supported by one or more suitable communication networks, such as, for example, a telecommunications network that allows communication via one or more telecommunications lines/channels. In particular, the communication or data networks, such as the Internet, may be used to deliver content, such as for the collaborative computing sessions herein. The Internet is an interconnection of computer clients and servers located throughout the world and exchanging information according to Transmission Control Protocol/Internet Protocol (TCP/IP), Internetwork Packet eXchange/Sequence Packet eXchange (IPX/SPX), AppleTalk, or other suitable protocol. The Internet supports the distributed application known as the "World Wide Web." Web servers maintain websites, each comprising one or more web pages at which information is made available for viewing and audio/hearing. Each website or web page may be supported by documents formatted in any suitable conventional markup language (e.g., HTML or XML). Information may be communicated from a web server to a client using a suitable protocol, such as, for example, Hypertext Transfer Protocol (HTTP) or File Transfer Protocol (FTP).

Figure 2:
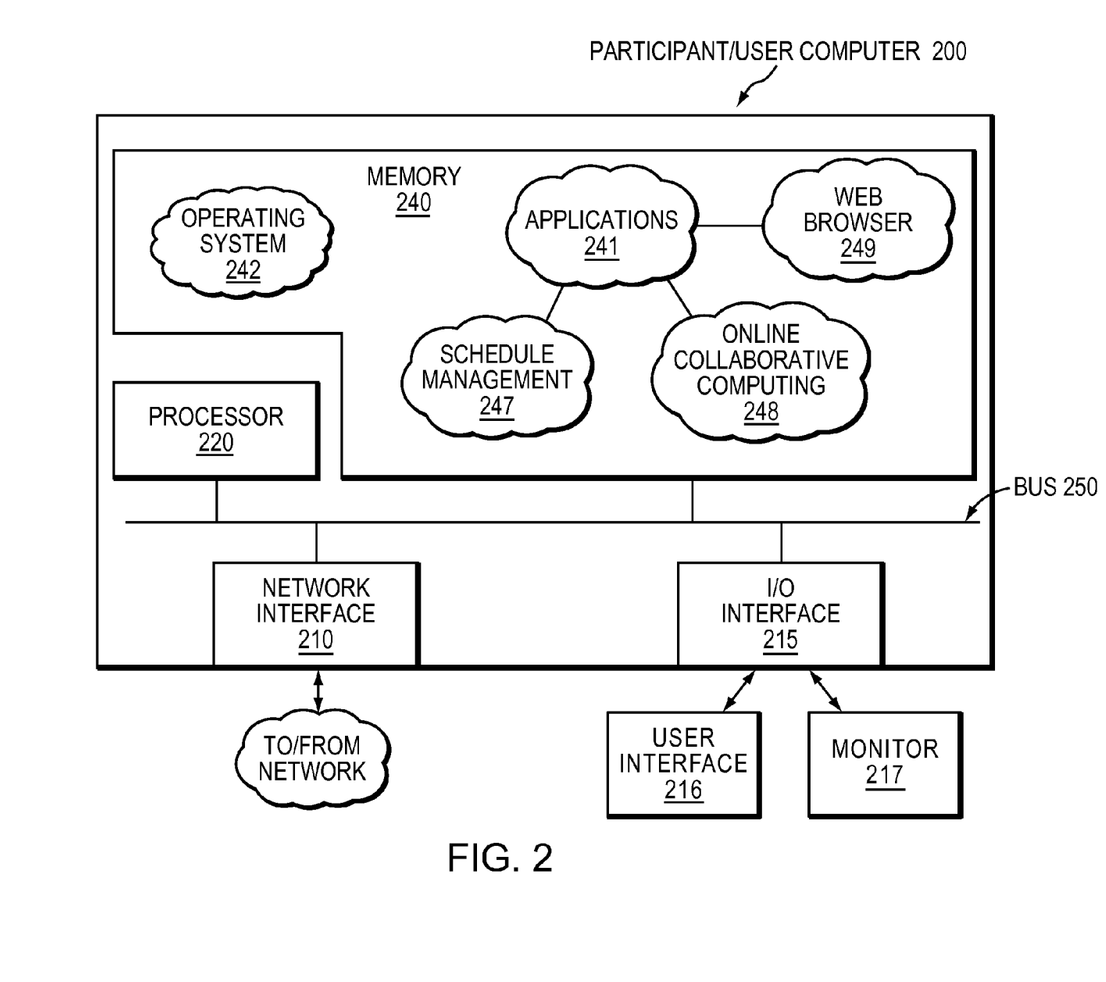
FIG. 2 illustrates an example computer.

FIG. 2 illustrates a schematic block diagram of an example participant/client device 200 that may be used with one or more embodiments described herein, e.g., for collaborative computing as participant/client devices. Illustratively, device 200 may be implemented or incorporated in any suitable computer such as, for example, a personal computer (PC), laptop, workstation, personal digital assistant (PDA), smart phone, mainframe, file server, workstation, or other suitable data processing facility supported by storage (either internal, e.g., electronic memory, or external, e.g., magnetic/optical disk), and operating under the control of any suitable OS.

In particular, the device 200 may comprise one or more network interfaces 210, one or more input/output (I/O) interfaces 215, one or more processors 220, and a memory 240 interconnected by a system bus 250. The network interfaces 210 contain the mechanical, electrical, and signaling circuitry for communicating data over physical/wireless links coupled to the network 120. The network interface(s) may be configured to transmit and/or receive data using a variety of different communication protocols suitable for the network (e.g., wired or wireless). Also, I/O interfaces 215 contain the mechanical, electrical, and signaling circuitry for communicating with one or more user interface devices 216, such as a mouse or keyboard, and a monitor/screen 217, etc.

The memory 240 comprises a plurality of storage locations that are addressable by the processor(s) 220 for storing software programs associated with the embodiments described herein. A portion of the memory may (though need not) be arranged as a cache configured to store one or more data structures and/or code modules associated with embodiments described herein. The processor(s) 220 may comprise necessary elements or logic adapted to execute the software programs and manipulate the data structures. An operating system 242, portions of which are typically resident in memory 240 and executed by the processor(s), functionally organizes the device by, inter alia, invoking operations in support of software processes and/or services executing on the device (e.g., for collaborative computing sessions as used herein). In particular, these software processes and/or services may comprise one or more applications 241 or "apps," such as email, web browsers 249 (e.g., Microsoft Internet Explorer, Mozilla Firefox, etc.), schedule management applications 247 (e.g., Microsoft Outlook, Lotus Notes, etc.), games, and so on, and, in particular, an online collaborative computing process 248, as described herein. It will be apparent to those skilled in the art that other types of processors and memory, including various computer-readable media, may be used to store and execute program instructions pertaining to the technique described herein.

The online collaborative computing process 245 may contain computer executable instructions executed by the processor 220 to generally perform functions to manage or control various processes or aspects during the course of an online meeting or collaborative computing session in which the participant (user) may interact with other users. For instance, an activity manager may manage meeting-related actions (e.g., starting a session, ending a session, locking a session, etc.), manage participant-related actions (e.g., designating a participant as a session host, assigning a participant the presenter privileges, expelling a participant, establishing participant privileges, etc.), manage session-related actions (e.g., starting a sharing session, closing a sharing session, setting privileges within that sharing session, etc.), and support an interface with the user or participant, and provide a container for embedding one or more application code modules.

Also, a communications component of process 245 may support communication between system 200 and an outside network 120 (e.g., the Internet), such as through network interfaces 210. The communications component thus allows data and information to be exchanged with or retrieved from other systems or facilities (e.g., participant devices 200 or interaction server 400), for example, during an online meeting or other collaborative computing session. In particular, the communications component may provide a communication platform for any one or more process instances of process 245. For instance, the activity manager may rely on the communications component to establish and maintain the client connection to the interaction server 400 on which the activity session is hosted. Any application code modules (not shown) may also use the established client connection to provide real-time data that is sent and received by each participant.

Various functionality for supporting a collaborative computing session, such as an online meeting, may be provided by the one or more application code modules, generally described herein as being components of the online collaborative computing process 245. These application code modules may be stored/maintained (e.g., by a cache), and may support, for example, basic communication framework, file sharing (e.g., for text, images, video, audio), remote access, user authentication, meeting scheduling, address book, files and folders, invoices, billing, scheduling, telephone or video conferencing, authentication, database management, word processing, application sharing, accounting, etc. For example, code modules may comprise (not specifically shown) a text-based chat module, a polling module, a video module, a voice over Internet Protocol (VOIP) module, a question-answer (QA) module, a file transfer module, a presentation module, an application/desktop view/share module, and an Internet telephony module.

Figure 3:
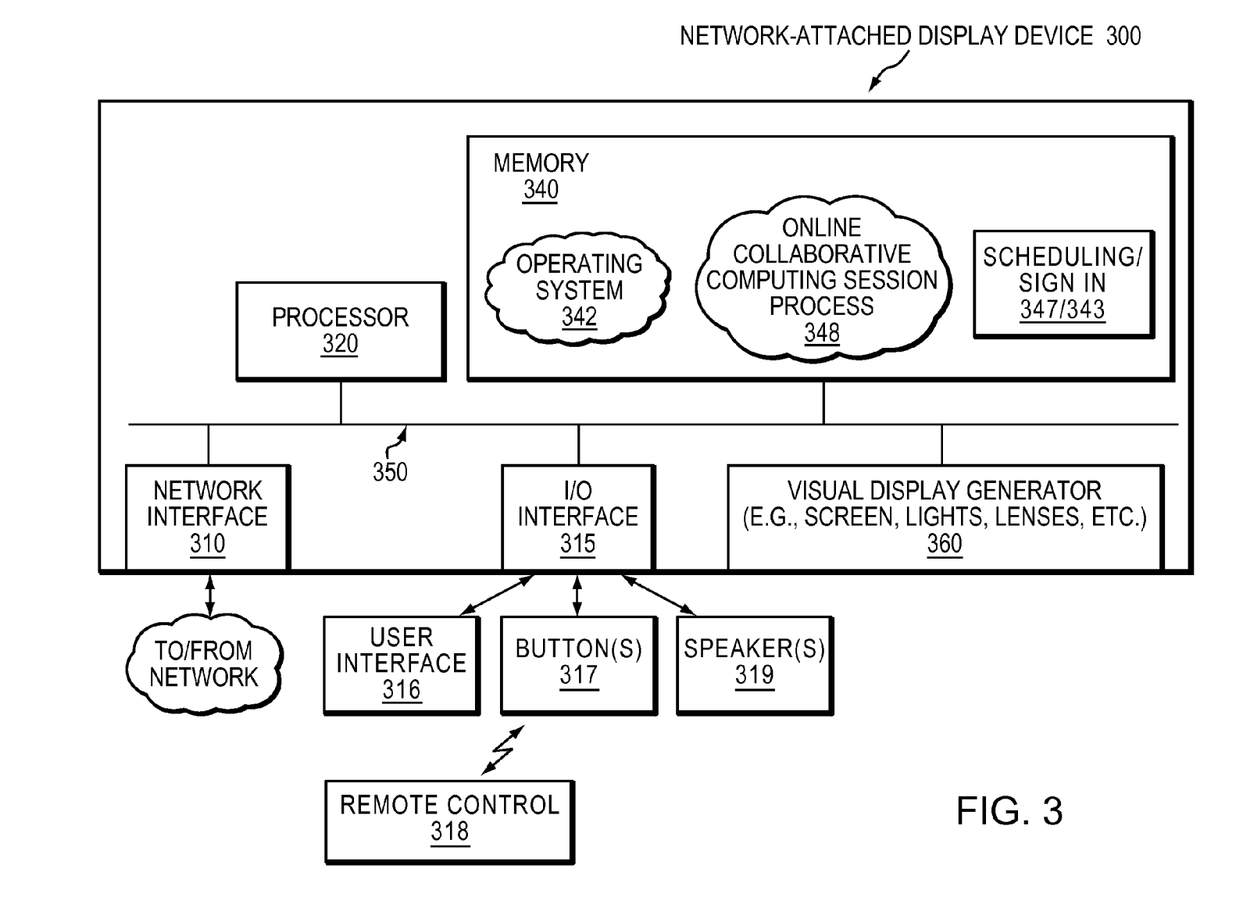
FIG. 3 illustrates an example network-attached display device.

Additionally, FIG. 3 illustrates a schematic block diagram of an example network-attached display device 300 that may be used in accordance with the embodiments described herein. Illustratively, display device 300 may be implemented or incorporated in any suitable device with visual capability, for example, a projector, a television (TV), a flat panel display, a flat screen TV, etc. In particular, the network-attached display device 300 may also comprise one or more network interfaces 310, one or more input/output (I/O) interfaces 315, a processor 320, and a memory 340 interconnected by a system bus 350. The network interfaces 310 contain the mechanical, electrical, and signaling circuitry for communicating data over physical/wireless links coupled to the network 120. The network interface(s) may be configured to transmit and/or receive data using a variety of different communication protocols suitable for the network (e.g., wired or wireless). Also, I/O interfaces 315 contain the mechanical, electrical, and signaling circuitry for communicating with one or more user interface devices 316, such as, e.g., a keypad, a specific online collaborative computing session "button" 317, a remote control 318, and speakers 319. A visual display generator 360 may be configured to render and visually display images (e.g., a graphics card), and may comprise circuitry necessary to do so (e.g., processors, applications, memory, lights, lenses, screens, etc.).

The memory 340 comprises a plurality of storage locations that are addressable by the processor 320 for storing software programs associated with the embodiments described herein. A portion of the memory may be arranged as a cache configured to store one or more data structures, such as an illustrative scheduling data structure 347 and a sign in cache 343 associated with embodiments described herein. The processor 320 may comprise necessary elements or logic adapted to execute the software programs and manipulate the data structures. An operating system 342 may, though need not, be used to functionally organize the display device. Software processes and/or services within the display device's memory may comprise an online collaborative computing process 348, which may be specifically tailored for use within a network-attached display device 300, as described herein.

Figure 4:
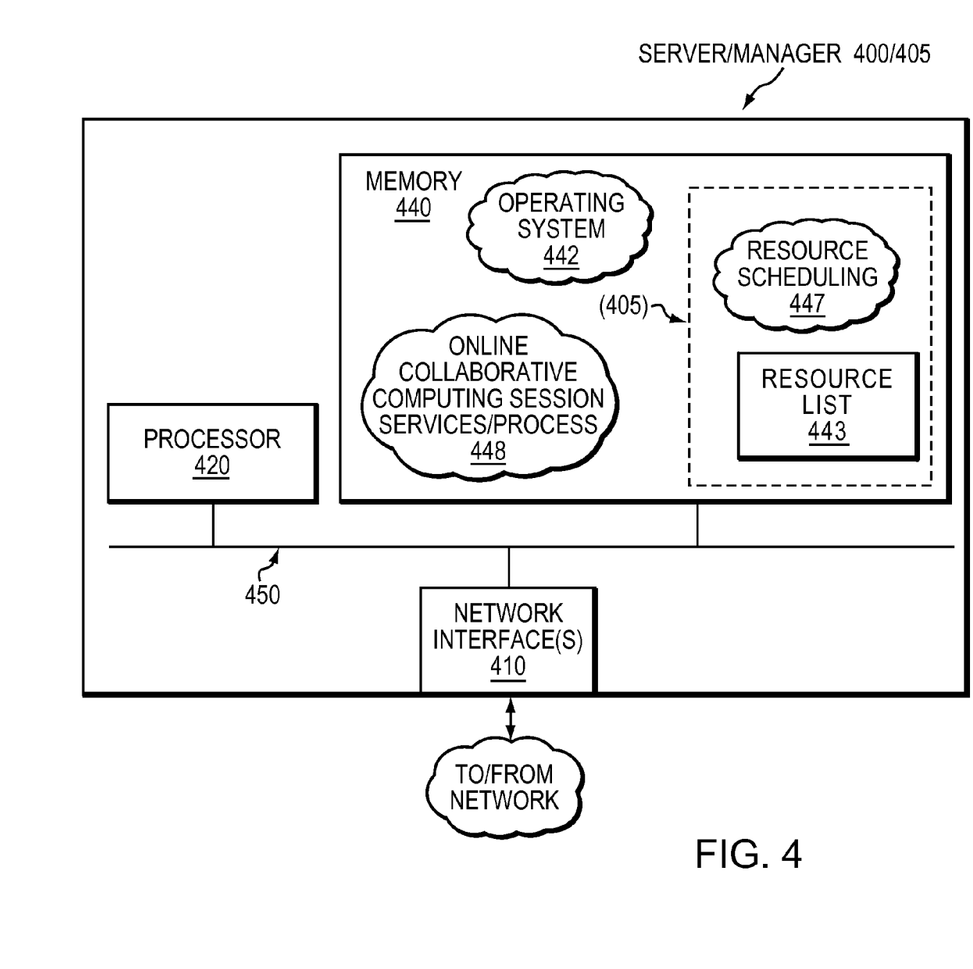
FIG. 4 illustrates an example server.

FIG. 4 illustrates an example implementation for a computer system that may operate as interaction server 400 and/or resource manager/server 405 according to one or more embodiments described herein (referred to collectively as server 400 for generally shared features). Note that while the illustrative embodiment described shows a single server, a collection of servers (e.g., localized and/or distributed) may also operate to perform the functions described herein. For example, "server 400" may comprise a separate server for each type of action (e.g., managing users, managing content, etc.), where the servers communicate with each other to produce the end result. Thus, "server 400" may comprise, either as a single server or as a collection of servers, one or more memories 440, one or more processors 420, one or more network interfaces 410 (e.g., adapted to communicate traffic for a communication session), etc., as may be appreciated by those skilled in the art.

In particular, referring to the environment shown in FIG. 4 as it relates to an interaction server 400, a number of processing facilities, including a web zone and one or more meeting zones for interaction with one or more client browsers. Collectively, the web zone and one or more meeting zones may be referred to simply as "online collaborative computing session services/process" 448. Specifically, a web zone may comprise one or more server machines that share a common web database. In the web zone, a web server may have a unique IP address (which may be associated with a particular website) and may respond to, e.g., Hyper-Text Transport Protocol (HTTP) requests coming to that IP address from client browsers. The web server serves or supports web pages, while a web database may contain static information for the website including site specific data, web pages, and user data. Also, a meeting zone is illustratively a collection of servers and databases that help perform synchronous activity of an online collaborative meeting. In a meeting zone, the meeting managers may be servers which communicate with other servers in the meeting zone (e.g., collaboration server, log server, ping server, etc.) to keep track of the online meetings in progress in the meeting zone. Meeting managers may log meeting information into a meeting database. The ping server works with meeting managers to determine a collaboration server that is most suitable for hosting a particular meeting; it may act as a load balancer for the meeting service. Collaboration servers may handle all real time control and communication during an online collaborative meeting. The application servers may support specific features that may be available as part of an online collaborative meeting, such as, for example, telephony, polling, chatting, video, voice over IP, document review, application sharing, and file sharing (e.g., "sub-sessions"). Also, a license manager may keep track of and enforce licensing conditions and charges for the meeting. Further, the log server may keep track of meeting logs, and the meeting database may maintain at least a portion of the transient data required to conduct and keep track of online meetings. This data may include, for example, site and user information that would be required to establish and conduct a meeting.

Notably, according to one or more embodiments described herein, an online collaborative computing session may comprise one or more "sub-sessions," such as a different sub-session for various components or features of the session itself. For instance, these sub-sessions may comprise, e.g., voice, data, desktop sharing, document sharing (portable document), video, chat, file transfer, remote access, etc. Communication and/or collaboration between participants may thus be achieved with one or more of the above sub-sessions enabled. For example, if a chat sub-session is enabled then an attendee can send a chat message to one or more other attendees while with desktop sharing sub-session enabled the presenter can share his/her desktop with all attendees, etc.

As FIG. 4 relates to an online collaborative computing resource manager or server 405 (e.g., "middleware"), additional processes/applications may be used for specific purposes as described herein. For example, a resource scheduling process 447 may contain computer executable instructions executed by the processor 420 to generally perform functions related to scheduling resources for the online collaborative computing sessions as described herein, illustratively maintaining an associated data structure 443 including a list of resources and/or their current assignments, associated information, etc., as described in more detail below. Notably, servers 400 and 405 may be embodied as a single device, or, as shown in FIG. 1, may be separately housed devices specifically tailored for individual usage.

B) Network-Attached Display Device as Attendee

As noted above, when participating in a meeting, whether in a physical conference room or over the internet through an online collaborative computing session, it may be beneficial to use a display device such as a projector to show images to a plurality of attendees. Generally, this has been accomplished through a physical connection between a participant's computer 200 and the display device in order to relay the image on the computer to the display device. As stated above, however, this may pose problems for certain users, such as those needing an adapter to connect to standard projectors, and when multiple presenters may be located within a same conference room. In particular, this causes problems when presenters change during the meeting, creating an unnecessarily time consuming exchange of the wires connected to the projector, in addition to the maintenance of presenter rights for the online collaborative computing session. Furthermore, generally setting up a projector in a conference room, particularly for online meetings, often requires cumbersome and inefficient manual configuration.

According to one or more embodiments of the disclosure, therefore, a network-attached display device (e.g., projector) 300 may actually join an online collaborative computing session as an attendee, such as by signing into the session using information obtained in a variety of ways. The display device may then receive data for the online collaborative computing session as an attendee over the computer network and may render and visually display images associated with being an attendee of the online collaborative computing session.

In other words, the embodiments herein describe a network (e.g., IP) enabled display device that is capable of receiving meeting information (e.g., scheduling), and capable of directly joining an online meeting without requiring an attached PC/laptop. That is, the display device may be an attendee of an online collaborative computing session as a resource (e.g., appliance) to the session/meeting without requiring a specific associated user, being able to autonomously and securely join a session (e.g., meeting or conference). Notably, in this essence, a network-attached display device that joins a session as an attendee is an extension of conventional IP-based projectors which merely receive data over an IP connection to be displayed, and which are not an active (i.e., "signed in" or "joined") attendee/resource to an online collaborative computing session.

Operationally, a network-attached display device 300 may be scheduled as an attendee for an online collaborative computing session (e.g., in advance of a session or meeting), or may alternatively be added as a resource on-demand (ad-hoc) as needed. In particular, to schedule a display device as a resource in advance, two illustrative scenarios exist. First, various schedule management applications 247 may be configured to schedule, based on a received user request, a conference room 130 and its associated display device 300, as well as associate the scheduled time with a particular online collaborative computing session. That is, an application 247 may be configured to schedule the conference room, and may be extended (e.g., a plug-in) to include the ability to schedule/associate a corresponding online session. As a second scenario, an online collaborative computing session application 248 may first be used to schedule the online session, and then a display device may be added as a resource/attendee to the session. In this scenario, the display device 300 may be pre-registered with the resource manager 405 (e.g., resource list 443) or the online collaborative computing session server 400 as a selectable resource (e.g., having identifying information, such as an IP address or conference room name), or the selected display device may be manually identified (e.g., entering an IP address or device name).

In addition to scheduling the display device in advance of the actual online collaborative computing session, display device may also be added as a resource on-demand (ad-hoc), such as where one or more users simply walk into a conference room and sit down to use the projector in that room. Various techniques may be used to control the joining of a meeting on the fly in this manner, such as by manually entering the online collaborative computing session information at the display device (e.g., meeting IDs, passwords, etc., as described below) through a user interface 316, selecting from a list of ongoing online sessions (as described below), or through smartphone wireless transfer, such as "dusting" or "throwing" session information from the phone (e.g., currently participating the online session) to an appropriately configured display device 300.

Regardless of whether the network attached display device 300 is associated with a particular online collaborative computing session prior to the session or during the session (e.g., ad-hoc), information is obtained that allows the computer network-attached display device 300 to receive data for an online collaborative computing session as an attendee. In other words, information needed by the display device to "join" the online session may be gathered for signing the device into the associated session. This information may comprise, among other things, a session identifier (ID), security information (passwords, keys, etc.), meeting names, IP addresses of the display device and/or servers, capabilities of the display device, calendar (date, time) information, etc. Notably, according to one or more embodiments herein, an indication of actual user attendees may also be linked to the display device through the obtained information, such as signifying which users are participating in the online collaborative computing session is through the display device. That is, in many situations, a conventional computer 200 may be identified as a participant to an online session based on the user's identification (e.g., "John Doe") within an attendee list. Accordingly, then, when registering the display device with a particular online collaborative computing session, it may also be beneficial to provide a list of associated users, for the benefit of other participants in the session (e.g., "John Doe, Jane Doe, and Judy Smith," or simply "ABC company" or "sales team," etc.).

In one embodiment, a resource manager 405 (e.g., middleware) may receive the information as a "proxy" for the scheduled display device 300, such as by receiving the request to include the display device as an attendee in the online collaborative computing session. For example, a resource scheduling application 447 of manager/server 405 may receive the information from a user's scheduling application 247 (or an associated server for the scheduling application). In one embodiment, the manager/server 405 may then "push" (e.g., transmit) the information to the display device 300 (stored in sign-in cache/scheduling data structure 343/347), or alternatively may store the information itself. In yet another embodiment, the display device 300 may itself receive the information directly, if so configured, such as by receiving manually entered information, as noted above.

Using the obtained information (session ID, scheduling, security, etc.), the network-attached display device 300 may then be signed into the online collaborative computing session as an attendee. Illustratively, having received the pushed or manually entered information, the display device may actively join the session (sign into the session) by submitting the information to the interaction (session) server 400 for authentication and/or registration into the online collaborative computing session (e.g., a meeting). Alternatively, the resource manager/server 405 may sign in the display device remotely, thus joining the display device into the online collaborative computing session to passively receive data as an attendee.

Figure 5A:
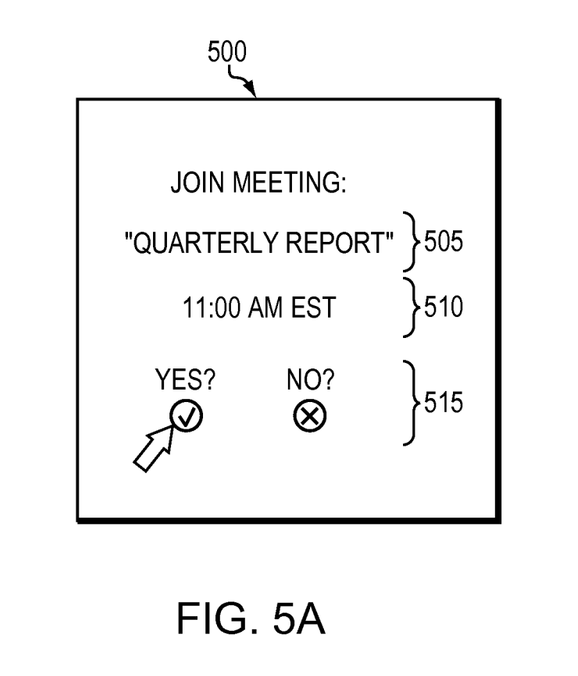
FIGS. 5A-B illustrate example displays.

According to one or more embodiments, there need not be any user intervention at the display device to obtain the information or sign the display device into the online collaborative computing session. For instance, prior to receiving any data associated with the online session, the display device may transition to a "power on and ready" state in response to an impending online collaborative computing session in which the display device is scheduled to be an attendee (e.g., based on a scheduled time of the session), and may sign into the session to begin receiving data. Alternatively, a user may have to turn on the display device and/or be prompted for acceptance of signing the display device into the online collaborative computing session, such as shown in FIG. 5A. As shown, a welcome message 500 may illustratively relay a meeting subject/name 505, a time 510, and an accept/decline icon 515. In other embodiment, the welcome message may replace the accept/decline icon 515 with a message to press a physical button 317 located on the projector as acceptance of the online session. A user may then select acceptance through pressing a user interface 316, the button 317, or a button or selection through the remote control 318, and the display device may then sign into the online collaborative computing session as an attendee.

Figure 5B:
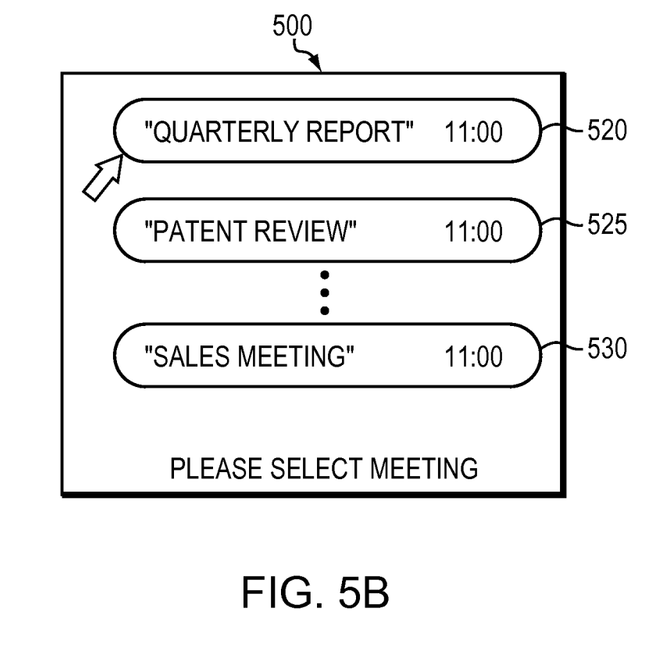

Note that as mentioned above, information to allow the display device to receive data for a plurality of online collaborative computing sessions as an attendee of each online collaborative computing session may be obtained. For instance, the network-attached display device 300 may be a resource available in a suite of conference rooms (e.g., within a building) where multiple meetings are scheduled. As such, people/users may be able to enter any conference room 130 and select from a plurality of pre-scheduled meetings into which they desire the display device of that conference room to join as an attendee. In this instance, the display device may prompt for selection of a particular online collaborative computing session into which the display device is to sign in as an attendee, e.g., from those stored in scheduling data structure 347. FIG. 5B illustrates an example display showing a selectable list of three possible meetings, 520, 525, and 530, into which the display device may become an attendee. Again, a user may select a particular session through a user interface 316, a set of buttons 317, or a button or selection through the remote control 318, and the display device may then sign into the selected online collaborative computing session as an attendee, using the associated information (e.g., stored in sign-in cache 343 of the device), accordingly.

Once the network-attached display device 300 has joined the session as an attendee, a presenter of the session's content (e.g., a meeting's host) may share images with the participants of the session, such as through desktop sharing or application sharing through online collaborative computing session process 248, and the images may be displayed on attendee devices, accordingly. Specifically, the display device may receive the data for the online collaborative computing session as an attendee over the computer network, and, through visual display generator 360, may render the images associated with the session in order to visually display them (e.g., project them onto a wall/screen). Note that while the data received by the display device attendee may be the same data received by all attendees of the online collaborative computing session, it may be different under certain circumstances. For instance, where a screen image is to appear different based on a "type" of attendee (e.g., user interfaced versus viewing attendee resource only), then various icons, options, etc., may be removed from data streams sent specifically to display device resources. Also, resolution may be controlled by the source of the content (e.g., server 400), such as based on pre-registered device capabilities or otherwise.

Further, based on device capabilities, the server 400 may source only images to display devices, and not audio (e.g., sending audio over a separate phone channel or not at all), or may source both images and audio to the display devices. When audio is transmitted and received, the display device may render the audio associated with the online collaborative computing session from the received data, and may play the audio on speakers 319 associated with the display device. As noted, the audio may be sent separately to conference room 130 over a phone channel to phone 135 (e.g., associated in resource list 443 or otherwise configured). In such an instance, it may also be possible to allow the phone 135 to act as an audio resource, such that users within the conference room 130 may be able to speak into the phone and be heard as part of the ongoing online collaborative computing session. When a "who is talking" feature is enabled for the session, an icon may indicate that a user/group associated with the display device 300 is talking. That is, the display device 300 and phone 135 may be registered as shared resources (or, less efficiently, as separate resources to generally a same group of users), such that other participants within the online collaborative computing session are aware of the attendees with the phone as well as the projector, as mentioned above.

Notably, the techniques herein generally eliminate the need for a wired connection between a participant's computer 200 and the display device (e.g., projector) 300, particularly a connection between the computer 200 and both the network 120 and the display device 300 for presenters where all attendees of the online collaborative computing session are not physically located within a same conference room 130. Now, the presenter computer, physically located within a same room as the display device, can transmit (source) the data for the online collaborative computing session over the computer network 120 via the online collaborative computing session to the display device as an attendee of the online collaborative computing session. When presenters change (e.g., sometimes referred to as "passing the ball"), the shared content is dynamically displayed on the network-attached display device (e.g., the conference room projector) as well as over the online collaborative computing session to other remote participants not in the room (or in the room and viewing the content on their own computers 200).

Figure 6:
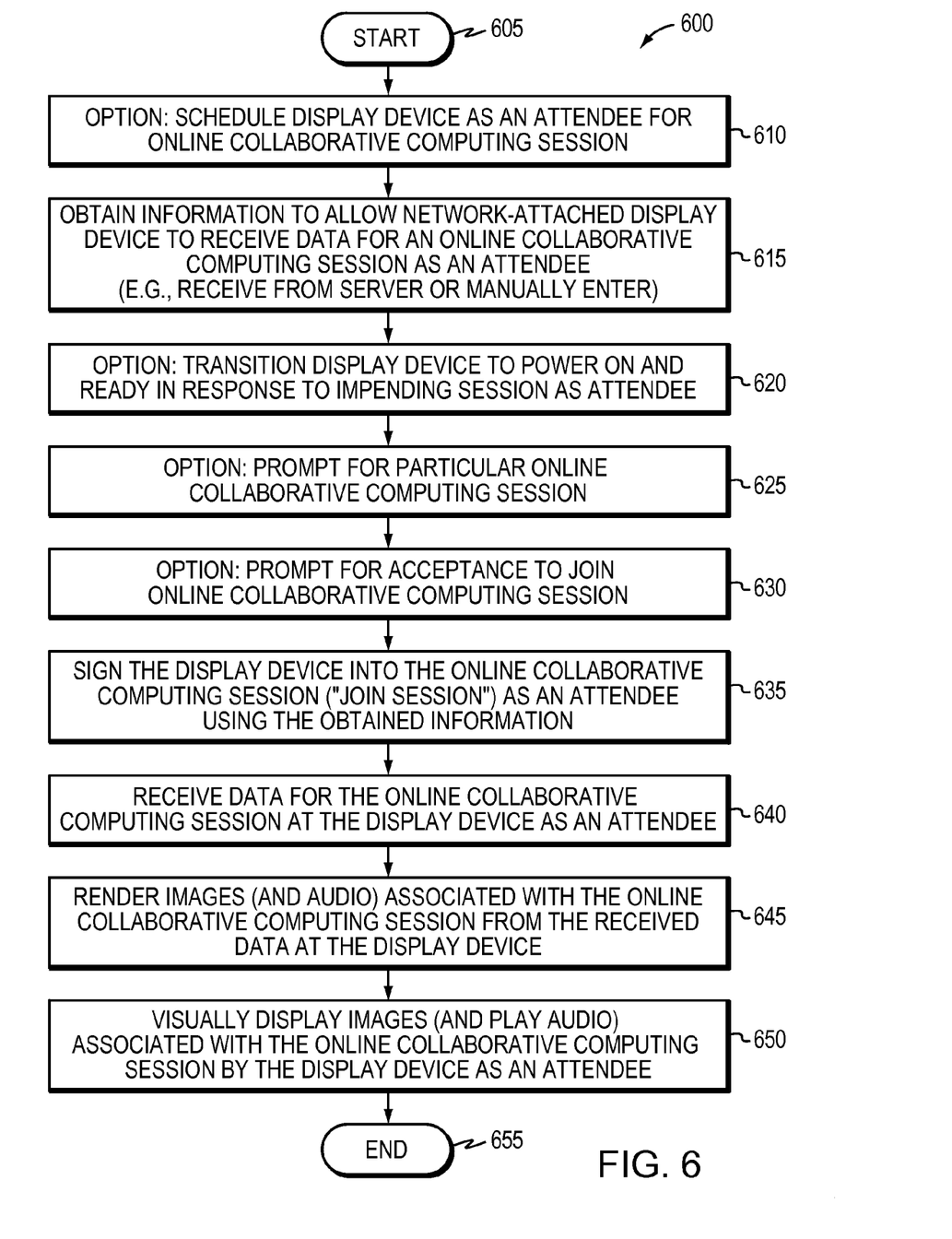
FIG. 6 illustrates an example procedure for allowing a network-attached display device join an online collaborative computing session as an attendee.

FIG. 6 illustrates a simplified example procedure for allowing a network-attached display device join an online collaborative computing session as an attendee in accordance with one or more embodiments described herein. The procedure 600 starts at step 605, and continues to step 610, where a network-attached display device 300 may optionally be scheduled as an attendee for an online collaborative computing session, as described above. In step 615, information is obtained to allow the display device to receive data for the online collaborative computing session as an attendee. For instance, as mentioned above, the information may be received from a server 400, or may be manually entered at the display device (e.g., user interface 316).

In response to an impending session to which the display device is to attend, various optional features may be enabled on the display device, accordingly. For instance, in step 620, the display device may transition to a "power on and ready" state to prepare for the online collaborative computing session, which, as noted, may imply leaving a standby state. Also, in step 625, the display device may prompt for selection of a particular online collaborative computing session, such as where there are multiple sessions available. In addition, in step 630, it may be desired to prompt for acceptance to join online collaborative computing session, as described above.

Once the display device 300 is signed into the online collaborative computing session ("joins" the session) as an attendee using the obtained information in step 635, then in step 640, once the session has started, the display device may receive attendee data for the session. As such, the display device in step 645 may render images (e.g., and audio) associated with the online collaborative computing session from the received data, and in step 650 may visually display the attendee-based images (e.g., and play audio) associated with the online collaborative computing session. The procedure 600 may end in step 655 upon termination of the online collaborative computing session (e.g., signing the display device out of the session or based on a signal from server 400).

Figure 7:
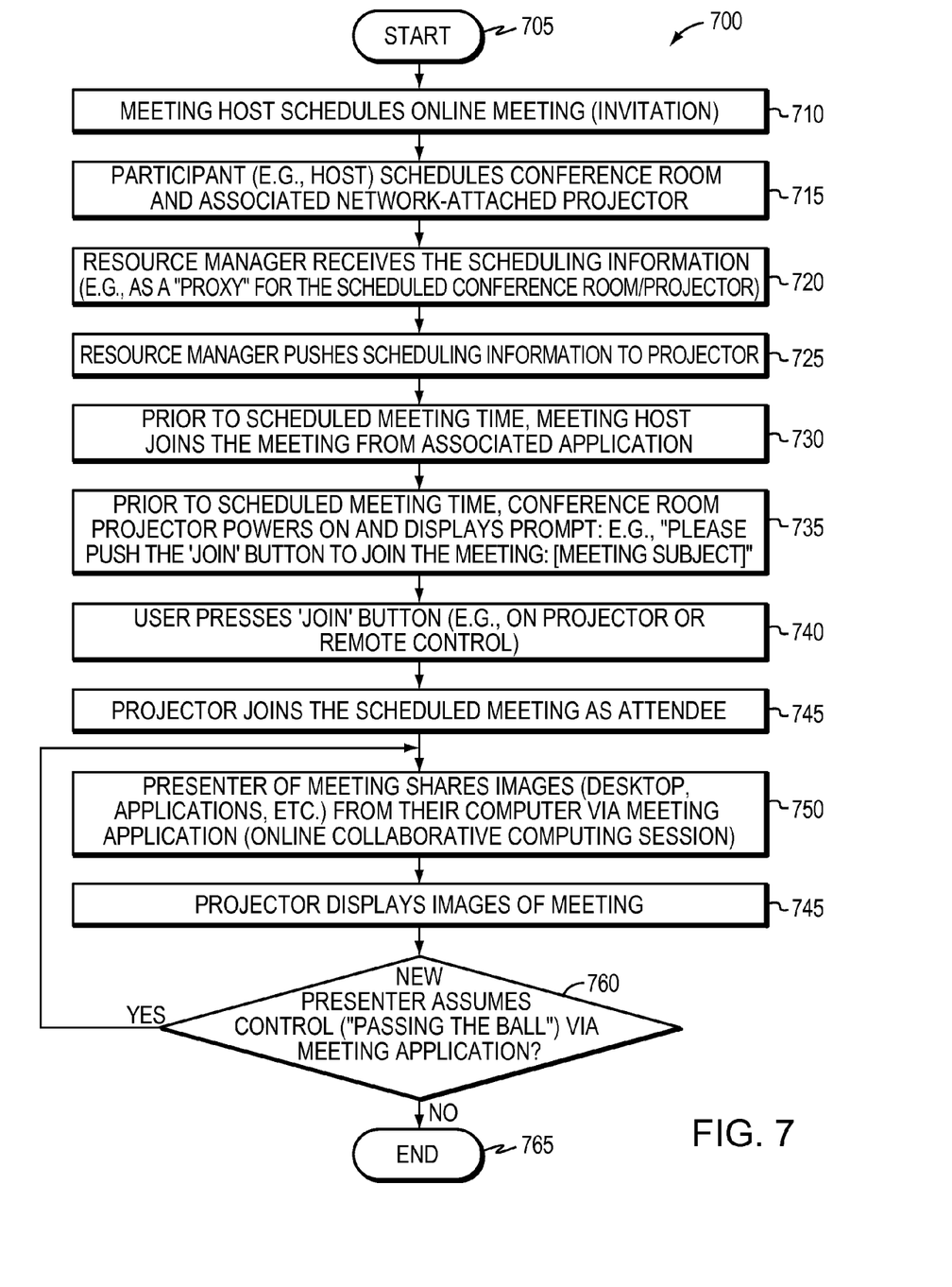
FIG. 7 illustrates an example procedure for using a network-attached display device as an attendee to an online collaborative computing session.

FIG. 7, on the other hand, illustrates an example procedure for using a network-attached display device as an attendee to an online collaborative computing session in accordance with one or more embodiments described herein, that is, from the perspective of display device users. The procedure 700 starts at step 705, and continues to step 710, where a meeting host schedules an online meeting, such as by setting up an invitation, scheduling time, inviting guests, etc., through illustrative online collaborative computing session application 248. In addition, in step 715 a meeting participant, e.g., the host scheduling the meeting or other participant, may schedule a conference room and its associated network-attached projector (display device 300), such as through scheduling application 247 or application 248. A resource manager (e.g., server 400) may receive the scheduling information in step 720, illustratively acting as a "proxy" for the scheduled conference room/projector, and may push the scheduling information to projector in step 725.

Prior to the scheduled meeting time (generally), the meeting host joins the meeting from an associated application in step 730 (e.g., online collaborative computing session application 248, web browser 249, etc.). Also, generally prior to the scheduled meeting time, in step 735 the conference room projector may power on (if necessary) and may display a prompt: "Please push the 'join' button to join the meeting: [Meeting subject]." Once the user presses a 'join' button in step 740, e.g., on the projector or via a remote control, the projector may join the scheduled meeting as attendee in step 745 as described in detail above.

During the course of the meeting, presenters may share images from their computers in step 750, such as via their desktop, applications, etc. through an associated meeting application 248. Accordingly, the projector (device 300) in step 755 displays those meeting images as through the projector were an attendee of the meeting. Should a new presenter assume control of the meeting in step 760, e.g., known as "passing the ball," then the new presenter sources new images in step 750, and the projector continues to display the meeting images in step 755 as an attendee, regardless of the presenter source. In this manner, regardless of whether all the participants to the meeting are in the same conference room, presenters need not physically connect to the projector, and presenters may alternate without having to reconfigure any connections to the projector. Procedure 700 may end once the meeting has concluded in step 765.

The novel techniques described herein allow a network-attached display device join an online collaborative computing session as an attendee. By having the display device (e.g., projector) join the session as an attendee itself, the novel techniques allow for shared content of the online collaborative computing session to be shown by the display device to one or more users, as well as to other attendees (e.g., on local PCs). In particular, the techniques described above eliminates the need for a meeting presenter to share content both via a network connection (to the online collaborative computing session) and via a local projector. Further, the techniques prevent conference room presenters from having to move from one place to another within the conference room in order to physically plug their laptop into the display device (e.g., projector) by eliminating the need to connect to the display device via a wired connection. This feature is particularly useful where a presenter's laptop/PC has a different display connection than the display device, such as Apple Mac users requiring a custom adapter (dongle). Also, the dynamic aspects of one or more embodiments described herein, such as the transfer of information necessary for the display device to join the session, alleviate the need for cumbersome and inefficient manual configuration.

While there have been shown and described illustrative embodiments that allow a network-attached display device join an online collaborative computing session as an attendee, it is to be understood that various other adaptations and modifications may be made within the spirit and scope of the embodiments herein. For example, the embodiments have been shown and described herein primarily directed to projectors. However, the embodiments herein in their broader sense are not so limited, and may, in fact, be used with other types of network-attached display devices, such as TVs, flat panels, flat screens, etc., as mentioned above. Moreover, while the circuitry involved in the display device's joining a session is shown as being housed within the display device, one or more alternative embodiments herein may also utilize a separately housed display device "agent" circuitry (not a PC/laptop) locally attached to the display device, such that the "network-attached display device 300" that signs into a meeting is the joint collaboration of a display agent and an actually displaying device.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible computer-readable medium (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
obtaining information to allow a computer network-attached display device to receive data to operate as an attendee device of an online collaborative computing session;
signing the network-attached display device into the online collaborative computing session as an attendee device using the obtained information, wherein no user is associated with the network-attached display device and wherein a plurality of other attendee devices and a presenter device each associated with a user are also signed into the online collaborative computing session;

receiving, at the network-attached display device, data associated with a display of the presenter device in the online collaborative computing session;

rendering, at the network-attached display device, images associated with the display of the presenter device from the received data; and visually displaying the images associated with the display of the presenter device at the network-attached display device.

2. The method as in claim 1, wherein obtaining comprises:
receiving the information over the computer network from a server configured to push the information to the network-attached display device.

3. The method as in claim 2, further comprising:
receiving, at the server, a request to include the network-attached display device as an attendee in the online collaborative computing session.

4. The method as in claim 1, wherein obtaining comprises:
receiving, at the network-attached display device, manually entered information.

5. The method as in claim 1, wherein obtaining comprises:
obtaining information to allow the network-attached display device to receive data for a plurality of online collaborative computing sessions as an attendee device of each online collaborative computing session; and
prompting, at the network-attached display device, for selection of a particular online collaborative computing session into which the network-attached display device is to sign in as an attendee device.

6. The method as in claim 1, further comprising:
receiving an indication that the presenter device is now an attendee device and that one of the other attendee devices is now a new presenter device;
receiving, at the network-attached display device, data associated with a display of the new presenter device in the online collaborative computing session;
rendering, at the network-attached display device, images associated with the display of the new presenter device from the received data; and
visually displaying the images associated with the display of the new presenter device at the network-attached display device.

7. The method as in claim 1, wherein signing in comprises:
obtaining the information at a server in the computer network; and
signing in the network-attached display device from the server.

8. The method as in claim 1, wherein there is no user intervention at the network-attached display device to obtain the information or sign the network-attached display device into the online collaborative computing session.

9. The method as in claim 1, wherein signing in comprises:
prompting for user acceptance of signing the network-attached display device into the online collaborative computing session.

10. The method as in claim 1, further comprising:
scheduling the network-attached display device as an attendee device for the online collaborative computing session in advance of the online collaborative computing session.

11. The method as in claim 10, further comprising, prior to receiving the data:
transitioning the network-attached display device to a power on and ready state in response to an impending online collaborative computing session in which the network-attached display device is scheduled to be an attendee device.

12. The method as in claim 10, wherein scheduling comprises:
receiving, by a scheduling application, a user request to include the network-attached display device as an attendee device in the online collaborative computing session.

13. The method as in claim 1, wherein the data received at the network-attached display device comprises different data than is received by other attendee devices of the online collaborative computing session such that the network-attached display device visually displays images that are different than images displayed by display devices of the other attendee devices.

14. The method as in claim 1, further comprising:
rendering audio associated with the online collaborative computing session from the received data at the network-attached display device; and
playing the audio associated with the online collaborative computing by speakers associated with the network-attached display device.

15. The method as in claim 1, wherein all attendee devices of the online collaborative computing session are physically located within a same room.

16. The method as in claim 1, wherein a presenter computer of the online collaborative computing session is physically located within a same room as the network-attached display device, and wherein the presenter computer transmits the data for the online collaborative computing session over the computer network via the online collaborative computing session to the network-attached display device as an attendee device of the online collaborative computing session.

17. The method as in claim 1, wherein the network-attached display device is a projector.

18. An apparatus, comprising:
a visual display generator configured to visually display rendered images;
a network interface adapted to receive data over a computer network;
a processor coupled to the network interface and visual display generator and adapted to execute one or more processes; and
a memory adapted to store instructions for a process executable by the processor, the instructions for the process when executed operable to:
join the apparatus into an online collaborative computing session as an attendee device of the online collaborative computing session, wherein no user is associated with the apparatus and wherein a plurality of other attendee devices and a presenter device each associated with a user also join the online collaborative computing session;
receive data for the online collaborative computing session as an attendee device over the computer network, wherein the data is associated with a display of the presenter;
render images associated with the display of the presenter device in the online collaborative computing session from the received data; and
visually display the images associated with the display of the presenter device via the visual display generator.

19. The apparatus as in claim 18, wherein the process when executed is operable to join the online collaborative computing session by obtaining information over the computer network from a server configured to push the information to the apparatus and by signing into the online collaborative computing session as an attendee device using the obtained information.

20. The apparatus as in claim 18, further comprising:
a user interface, wherein the process when executed is operable to join the online collaborative computing session by obtaining manually entered information and by signing into the online collaborative computing session as an attendee device using the obtained information.

21. The apparatus as in claim 18, further comprising:
a user interface, wherein the process when executed is operable to determine an ability to join a plurality of online collaborative computing sessions as an attendee device, the process further operable to prompt, via the user interface, for selection of a particular online collaborative computing session the apparatus is to join as an attendee device.

22. The apparatus as in claim 18, wherein the process when executed is operable to:
receive an indication that the presenter device is now an attendee device and that one of the other attendee devices is now a new presenter device;
receive data associated with a display of the new presenter device in the online collaborative computing session;
render images associated with the display of the new presenter device from the received data; and
visually display the images associated with the display of the new presenter device via the visual display generator.

23. The apparatus as in claim 18, wherein the apparatus is a projector.

24. A system, comprising:
a computer;
a server; and
a network-attached display device;
the computer configured to receive a user request to include the network-attached display device as an attendee device in an online collaborative computing session, and transmit the request to the server;
the server configured to receive the request, and push corresponding information to the network-attached display device, the information to allow the network-attached display device to receive data for the online collaborative computing session as an attendee device of the online collaborative computing session; and
the network-attached display device configured to:
join the online collaborative computing session as an attendee device of the online collaborative computing session using the pushed information, wherein no user is associated with the network-attached display device and wherein a plurality of other attendee devices and a presenter device each associated with a user also join the online collaborative computing session,
receive data for the online collaborative computing session as an attendee device over a computer network, wherein the data is associated with a display of the presenter device in the online collaborative computing session,
render images associated with the display of the presenter device in the online collaborative computing session from the received data, and
visually display the images associated with the display of the presenter device in the online collaborative computing session.

\* \* \* \* \*

UNITED STATES PATENT AND TRADEMARK OFFICE
CERTIFICATE OF CORRECTION

| | | |
|---|---|---|
| PATENT NO. | : 8,909,704 B2 | Page 1 of 1 |
| APPLICATION NO. | : 12/770324 | |
| DATED | : December 9, 2014 | |
| INVENTOR(S) | : Michael E. Flannagan et al. | |

It is certified that error appears in the above-identified patent and that said Letters Patent is hereby corrected as shown below:

In the claims

Column 14, line 61, insert the word --device-- after the word "presenter"

Signed and Sealed this
Sixth Day of October, 2015

Michelle K. Lee
*Director of the United States Patent and Trademark Office*